T. J. WEEKS.
CORN REMOVING GRINDER.
APPLICATION FILED OCT. 12, 1912.

1,096,875.

Patented May 19, 1914.

UNITED STATES PATENT OFFICE.

THOMAS J. WEEKS, OF PITTSTON, PENNSYLVANIA.

CORN-REMOVING GRINDER.

1,096,875.  Specification of Letters Patent.  Patented May 19, 1914.

Application filed October 12, 1912. Serial No. 725,475.

*To all whom it may concern:*

Be it known that I, THOMAS J. WEEKS, a citizen of the United States, and a resident of the city of Pittston, county of Luzerne, State of Pennsylvania, have invented certain new and useful Improvements in Corn-Removing Grinders, of which the following is a specification.

The object of this invention is to provide a simple and inexpensive surgical appliance for removing corns and calli by the grinding method, with a preferred form of the device and by the simple train of gearing, and a rotary cone shaped grinding implement, as more fully hereinafter set forth.

Figure 1:
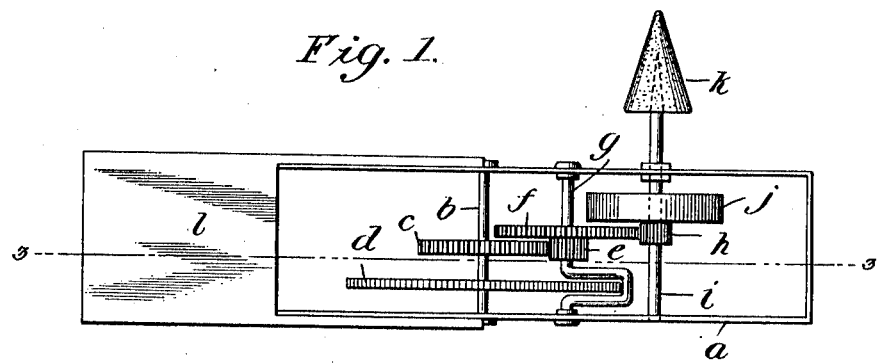
Figure 2:
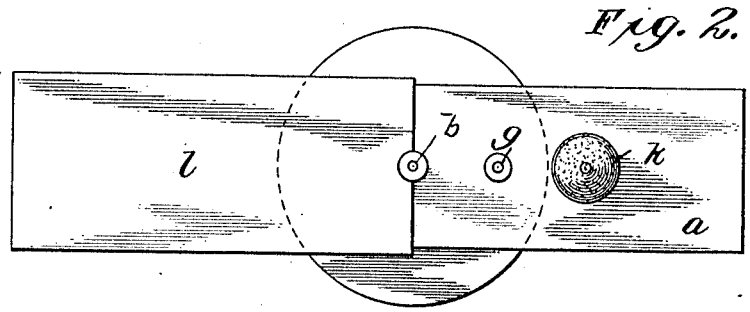
Figure 3:
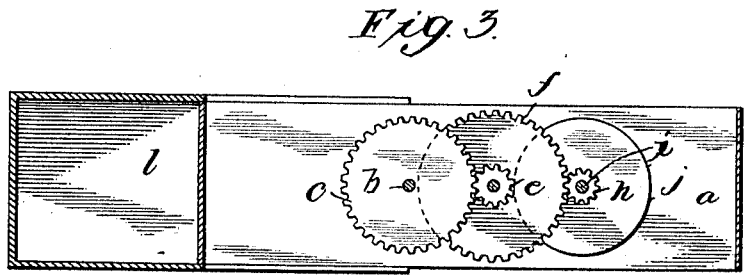

Figure 1 is a plan view of my improved device. Fig. 2, is a side elevation thereof, and Fig. 3 is a longitudinal section on the line 3—3 of Fig. 1.

Referring to the drawing, by reference characters, $a$ designates a suitable frame consisting of side plates and suitable connecting plates in which is journaled a transfer shaft $b$, carrying a gearing $c$, and a thumb wheel $d$. The gearing $c$ meshes with the pinion $e$ which is affixed to a gear $f$, these two latter gearings being rotatably mounted on a rod $g$. The gear $f$ meshes with a pinion $h$, which is affixed to a rotary shaft $i$ journaled in the frame and carrying a balance wheel $j$, and on its projecting end a grinding cone $k$. This cone $k$ is preferably of a piece of solid cork provided on its pointed end with a suitable gritty substance.

It will be observed that by rotating the thumb wheel $d$, a very rapid rotation will be given to the cone, and this rotation will be steadied by the balance wheel $j$. It will be observed that the gear wheels are inclosed within the frame, while the thumb wheel is large enough to extend in opposite directions beyond the frame; this is in order that the implement may be grasped in the hand of the operator without interfering with or being injured by the gear wheels, and at the same time permit the thumb and one of the fingers of the hand to be used in turning the thumb wheel $d$, whereby the cone may be rotated by means of the same hand that holds the implement. In using this implement, the point of the cone is placed against the center of the callus or corn and pressed lightly thereagainst during the rotation of the cone. The implement is used from time to time until the corn or callus is entirely removed. This process of removing the corn, etc., has been found to be very effectual, and practically painless. It will be desirable to supply a number of the cones with each implement, and to make the cones removable in order that when one cone is worn out, it may be replaced by a new one. The frame may be provided with a suitable receptacle $l$, for the reception of the supply of cones. The gearing may be operated by any other means as found desirable.

Having thus described my invention, what I claim as new, and desire to secure by Letters Patent, is—

An implement of the class described, comprising a frame, a plurality of shafts in parallel alinement and in close relation mounted transversely in one end of said frame, one of said shafts having one end projecting outside of said frame an appreciable distance, a grinding cone removably fixed on said projecting end, a fly-wheel on the same shaft within the frame, speed multiplying gearing mounted within the frame on said shafts and adapted to rotate the fly-wheel shafts at a high speed, and means mounted on one of said shafts for manually operating said shafts through said multiplying gearing.

In testimony whereof I hereunto affix my signature in the presence of two witnesses.

THOMAS J. WEEKS.

Witnesses:
 BENJ. A. CROWTHER,
 W. P. RINUS.

---

Copies of this patent may be obtained for five cents each, by addressing the "Commissioner of Patents, Washington, D. C."